(No Model.)
M. H. WHITCOMB.
FISHING APPARATUS.
No. 253,456. Patented Feb. 7, 1882.
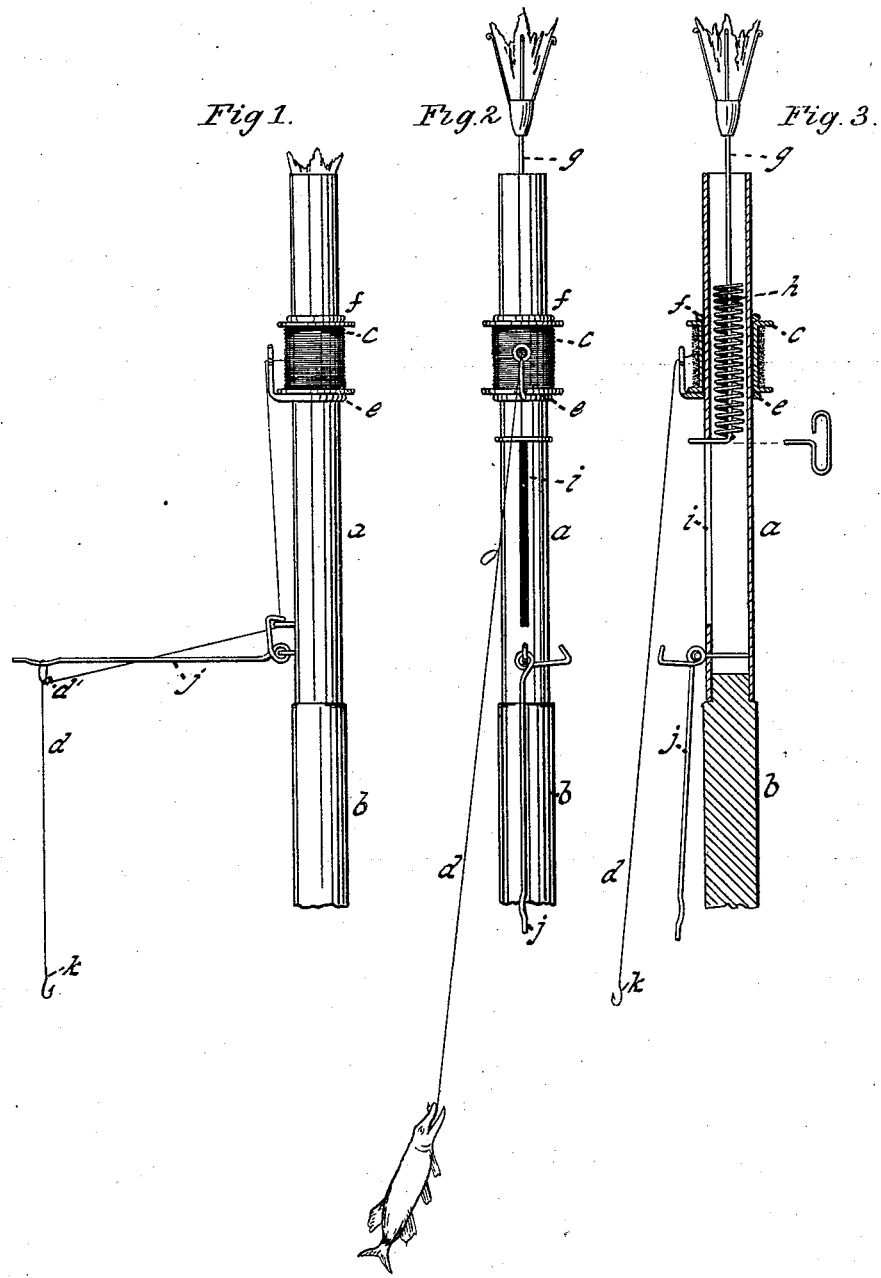
Witnesses.
Chas. L. Burdett.
W. Marsh
Inventor.
Maurine H. Whitcomb
By W. E. Simonds
Atty.

UNITED STATES PATENT OFFICE.

MARCIENE H. WHITCOMB, OF HOLYOKE, MASSACHUSETTS.

FISHING APPARATUS.

SPECIFICATION forming part of Letters Patent No. 253,456, dated February 7, 1882.

Application filed January 5, 1881. (No model.)

*To all whom it may concern:*

Be it known that I, MARCIENE H. WHITCOMB, of Holyoke, in the county of Hampden and State of Massachusetts, have invented a certain new and useful Improvement in Fishing Apparatus, of which the following is a description, reference being had to the accompanying drawings, where—

Figure 1 is a side view of the apparatus set or adjusted for fishing. Fig. 2 is a front view of the apparatus sprung or unset. Fig. 3 is a view of the apparatus sprung or unset, but in the same position as indicated in Fig. 1 in central longitudinal vertical section.

The apparatus is designed to be set after the fashion of a trap, notably for fishing through holes made in the ice in winter, so that when a fish bites at the hook a signal denoting the fact shall be automatically displayed.

The letter $a$ denotes a round tube, which forms the body of the apparatus, into the lower end of which is inserted a stick, $b$, to serve as a standard. On the outside of tube $a$ there is hung a spool, $c$, to hold the fish-line $d$. The lower end of this spool bears on the stop $e$, and the spool is kept in place on the upper side by the elastic clasp $f$, which can be moved up and down on the tube, permitting the spool to be removed, and can be set to bear against the end of the spool with sufficient friction to prevent the spool from turning with undue ease. Inside the tube is a piston, $g$, the upper end of which is furnished with pompon, flag, or other suitable device as a signal, which comes down pretty well into the tube when the device is set, as seen in Fig. 1, but which shoots up into sight when the device is sprung, as seen in Figs. 2 and 3. This piston is impelled upward by a spring, $h$, one end of which is attached to the tube and the other end of which is attached to the piston. The piston, which is practically a rod, is bent out laterally at the lower end, projecting through a vertical slot, $i$, made in the wall of the tube, forming a tappet for co-operation with the tripping-lever $j$, which is pivoted to the outside of the tube, and having its inner end formed into a hook to catch upon the lateral projection of the piston, with its other end (when the device is set) projecting laterally for connection with the fish-line. A loop at a convenient point is tied in the line, denoted by $d'$, and hung upon the outer end of the tripping-lever, as seen in Fig. 1. Thence it drops down into the water with a hook, $k$, suitably baited depending therefrom.

When a fish takes hold of the hook, and, as is natural, pulls upon it, the hook of the tripping-lever is detached from the lateral projection of the piston, which, being thus freed, flies up and displays the pompon at the top.

The apparatus can be very compactly packed when not in use. The line can be wound upon the spool, the long end of the tripping-lever confined within the loop which forms the projecting tappet of the piston, the pompon detached from the piston and stuck into the tube, and the point of the fish-hook stuck into the lower end of the pompon.

I claim as my invention—

1. The combination of the tubular body, the spring-piston with its signal-top, the tripping-lever, and the fish-line, all substantially as described, and for purposes specified.

2. The combination of the tubular body, the spool thereon, the spring-piston, the tripping-lever, and the fish line, all substantially as described, and for purposes specified.

MARCIENE H. WHITCOMB.

Witnesses:
HENRY H. SMITH,
PLINY J. CRAFTS.